United States Patent [19]

Chacon

[11] Patent Number: 5,562,177
[45] Date of Patent: Oct. 8, 1996

[54] VEHICLE ANTI-THEFT SYSTEM

[76] Inventor: Alfonso W. Chacon, 4901 N. Christiana, Apt. 16, Chicago, Ill. 60625

[21] Appl. No.: 437,302

[22] Filed: May 9, 1995

[51] Int. Cl.⁶ .................................................. B60R 25/00
[52] U.S. Cl. ............................ 180/287; 70/237; 70/234; 280/762
[58] Field of Search ............................ 180/287; 280/293, 280/295, 297, 298, 301, 304, 762, 763.1, 764.1, 765.1, 766.1; 70/237, 233, 234, 235; 248/352

[56] References Cited

U.S. PATENT DOCUMENTS

| | | | |
|---|---|---|---|
| 577,808 | 2/1897 | Myers | 70/234 |
| 3,857,575 | 12/1974 | Lee | 280/763.1 |
| 4,103,923 | 8/1978 | Thomas | 280/298 |
| 4,126,330 | 11/1978 | Poole | 70/237 |
| 4,271,690 | 6/1981 | Jaulmes | 70/233 |
| 4,568,103 | 2/1986 | Celentino | 280/765.1 |
| 4,777,377 | 10/1988 | Jeter . | |
| 4,881,615 | 11/1989 | Conway . | |
| 4,977,974 | 12/1990 | Brown | 180/287 |
| 4,982,810 | 1/1991 | Toy | 180/287 |
| 4,993,248 | 2/1991 | Nordberg . | |
| 5,005,391 | 4/1991 | Gibson . | |
| 5,061,915 | 10/1991 | Murphy . | |

FOREIGN PATENT DOCUMENTS

| | | | |
|---|---|---|---|
| 138773 | 4/1934 | Austria | 280/293 |
| 37634 | 10/1935 | Netherlands | 280/293 |
| 2271330 | 4/1994 | United Kingdom | 180/287 |

*Primary Examiner*—Eric D. Culbreth
*Assistant Examiner*—Peter C. English
*Attorney, Agent, or Firm*—Gerstman, Ellis & McMillin, Ltd.

[57] ABSTRACT

An anti-theft system for vehicles comprising an extendible bar permanently carried by a vehicle. The extendible bar is movable between an extended position for locking the vehicle in place and a retracted position when the vehicle is in use. A connector is provided, separate from the vehicle and secured in stationary position. The connector is capable of forming a releasable, locked connection with the bar in the extended position.

14 Claims, 3 Drawing Sheets

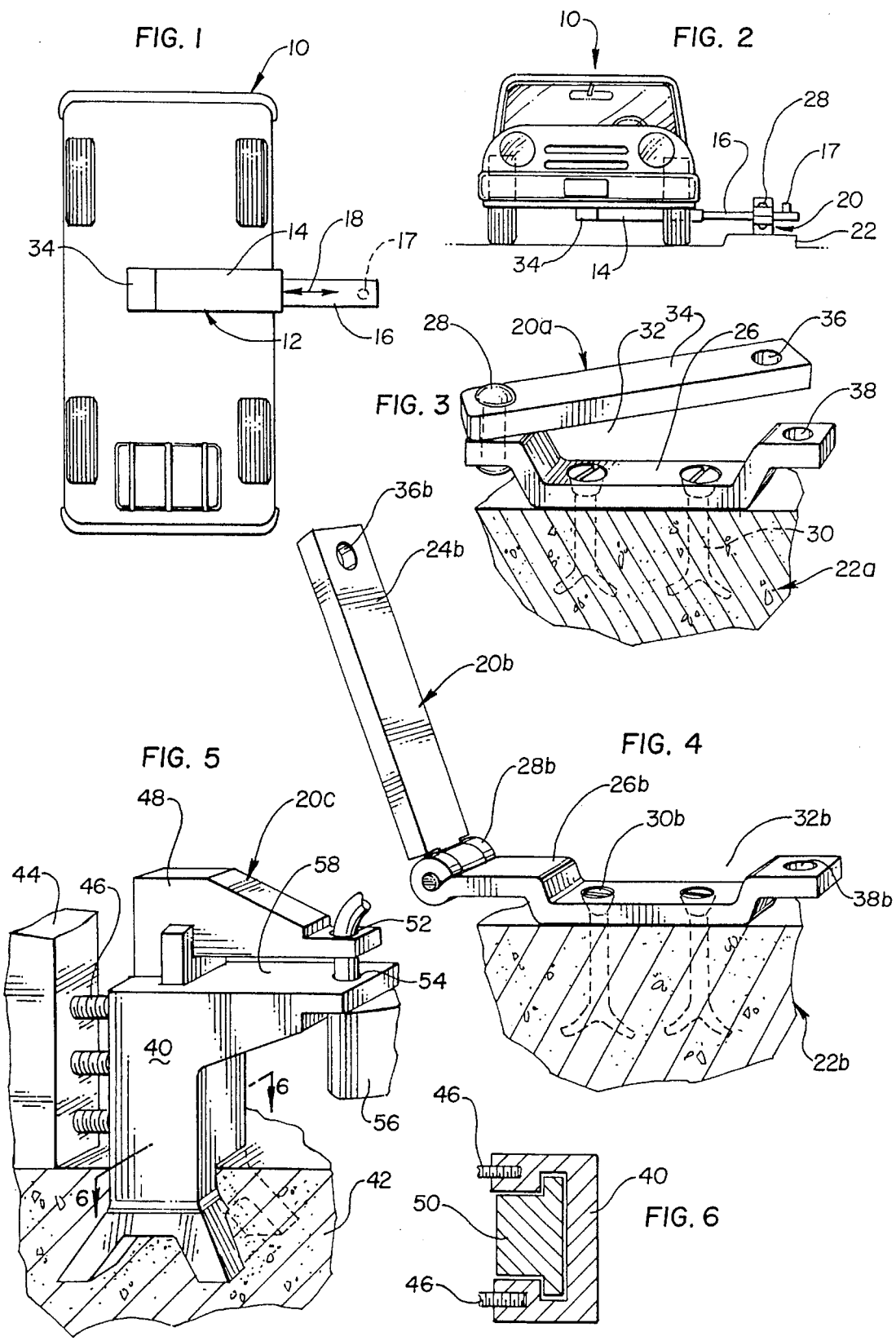

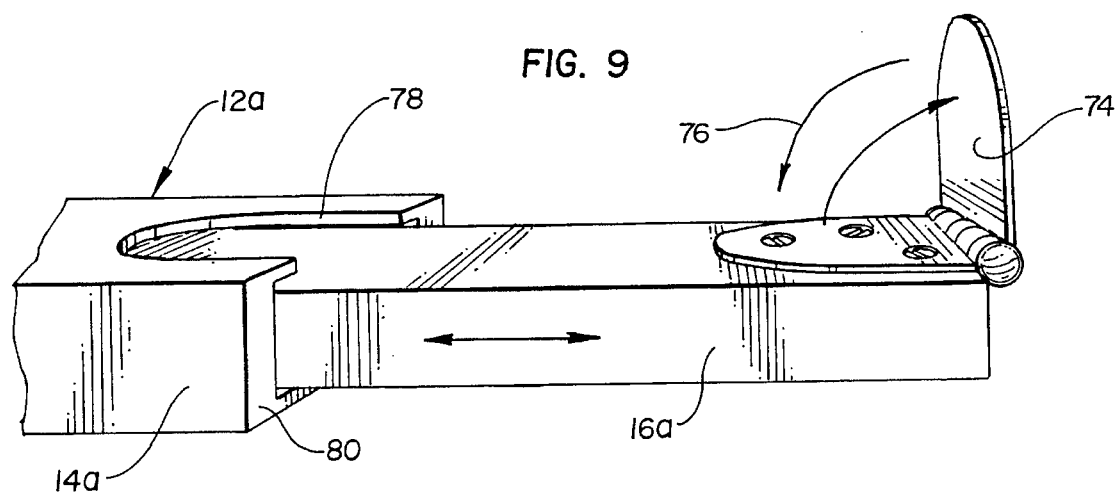

VEHICLE ANTI-THEFT SYSTEM

BACKGROUND OF THE INVENTION

Various anti-theft systems for vehicles are known, many of which pertain to the locking of the steering wheel or disabling of the motor in some way to prevent theft. However, most of these systems turn out to be imperfect, particularly because the thief can often break through them from inside of the vehicle, where he is less likely to be observed. Also the vehicle can still be towed by a thief.

In accordance with this invention, a simple, positive anti-theft system is provided, where the vehicle cannot even be taken by a tow truck or the like. Also, disabling of the theft system generally requires brute force breakage, and has to be performed outside of the vehicle, where one is more likely to be observed.

DESCRIPTION OF THE INVENTION

By this invention, an anti-theft system for vehicles is provided, which system comprises: an extendible bar permanently carried by a vehicle. The extendible bar is movable between an extended position for locking the vehicle in place, and a retracted position when the vehicle is in use. A connector is also provided, separate from the vehicle and secured to a stanchion or the like in stationary position. The connector is capable of forming a releasable, locked connection with the bar in the extended position.

Thus, the vehicle becomes literally shackled to a stationary position through the bar and other parts that are made of appropriate high strength.

In some embodiments, the extendible bar may be pivotally carried on a vehicle, to swing outwardly into engagement with the connector. In other embodiments, the extendible bar is carried on the vehicle in longitudinally slidable position. The extendible bar may comprise a plurality of telescoping bar sections which one advances out of another bar section in longitudinal sliding relation into the extended position.

If desired, a power unit may be used to cause the telescoping bar to extend and retract, or to cause the pivoting bar to pivot.

Typically, the extendible bar of this invention comprises a free end and a locking lug projecting typically upwardly from the bar adjacent the free end of the bar. The free end of the bar then engages the connector. Alternatively, the bar may carry a locking aperture to allow shackling to the connector.

The connector may comprise a top plate and a bottom plate, the plates being movably connected to define between them, in an adjacent, parallel position, an aperture sized to receive and lock the extendible bar. At least one of the plates is movable to a separated position, permitting insertion and removal of the bar into and out of locked position in the aperture. The same plate is movable into a locking position, where the free end of the extendible bar is retained.

As an equivalent, the connector may be the part carried by the car, and the extendible bar may be secured to a stanchion, a wall, or the like for connection with connectors carried on cars in a manner which may otherwise be similar to that which is specifically disclosed herein.

Thus a vehicle such as a car, truck, or the like may be physically secured to a strong restraint, so that the vehicle cannot be stolen even if the vehicle is placed in the gear and the engine is raced. Preferably, the parts of this invention are built of a strength capable of withstanding the forces generated in that manner.

DESCRIPTION OF THE DRAWINGS

FIG. 1 is a bottom plan view of one embodiment of an automobile modified in accordance with this invention;

FIG. 2 is a front elevational view of the same embodiment, showing the extendible bar in its extended position and the vehicle locked to a connector which, in turn, is carried on a stanchion;

FIGS. 3 and 4 are perspective views of particular designs of connector which may be used particularly with the embodiment of FIGS. 1 and 2;

FIG. 5 is another embodiment of a connector which may be used in accordance with this invention;

FIG. 6 is a sectional view taken across line 6—6 of FIG. 5;

FIGS. 7-9 are added embodiments of extendible bars which may be carried on vehicles in accordance with this invention;

DESCRIPTION OF SPECIFIC EMBODIMENTS

Figure 7:
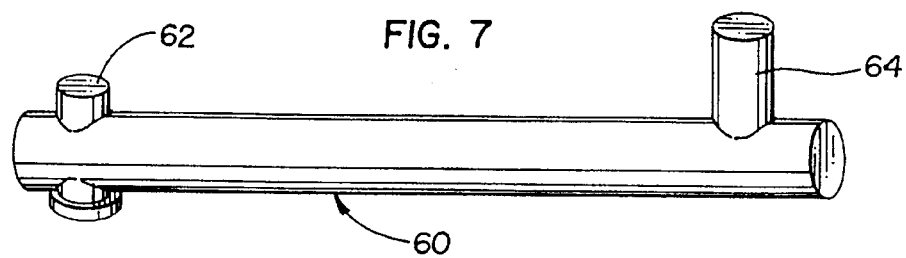

Referring to FIGS. 1 and 2 an automobile 10 is shown, which carries an extendible bar component 12 of the anti-theft invention. Extendible bar 12 comprises an outer housing portion 14 in which an inner sliding bar portion 16 may be carried in longitudinally slidable, telescoping relation, to permit motion as indicated by arrow 18. Thus, sliding bar 16 can move inwardly to a position where it does not project substantially out to the side of vehicle 10, and an extended position as shown in FIGS. 1 and 2, where sliding bar 16 does so project laterally outwardly to engage a connector 20, which is carried by a stanchion 22, the wall of a building, or the like.

Detailed examples of connectors 20 are shown in FIGS. 3-6.

In FIG. 3, a first embodiment of connector 20a comprises a pair of connected plates 24, 26, which are pivotally connected by pivot 28. Connector 20a may then be connected by concrete screws 30 or the like to the concrete mass of a stanchion 22a.

Accordingly, when pivoting upper plate 24 is pivoted away from parallel relation with lower plate 26, a car may be drawn up next to connector 20a, and sliding bar 16 extended to pass through the opening 32 that is defined between the respective plates 24, 26. Then, pivoting upper plate 24 may be brought into parallel registry with lower plate 26, and a lock may be applied through the two aligned apertures 36, 38 to hold the respective plates of the connector in locked position. Then, because of the presence of locking lug 17 on the portion of sliding bar 16 that extends through connector 20a, interference between locking lug 17 and upper locked plate 24 will prevent the automobile 10 from being removed without opening connector 20a, because bar 16 is retained in the connector.

Referring to FIG. 4, another design of connector 20b is shown comprising an upper plate 24b and lower plate 26b connected together by a vertical pivot 28b. As before, connector 20b may be secured with concrete screws 30b to a concrete stanchion 22b or the like.

As in the previous embodiment, the sliding bar portion 16 of a parked car may be extended to occupy aperture 32b, following which upper plate 24b is closed, and a shackle-type lock like lock 56 (FIG. 5) is placed through apertures 36b, 38b. As before, locking lug 17 of sliding bar 16 will engage upper plate 24b when connector 20b is in its locked position, so that the vehicle 10 cannot be driven away.

Sliding bar 16 may be advanced and retracted by the action of an electric motor 34 which is conventionally linked by one of several types of advancement systems to automatically cause the extension and retraction of bar 16. Motor 34 may be controlled from the driver's seat, if desired.

Referring to FIGS. 5 and 6, another design of connector is shown for receiving a sliding bar of an automobile. Connector 20c comprises a base member 40, which is shown to be secured to a concrete pavement 42 or the like. Also, base member 40 is shown to be attached to a reinforced concrete stanchion 44, or a wall or the like, by bolts 46.

Upper member 48, like base member 40, may be made of steel, being massive for resistance to forceful assault by car thieves. Upper member 48 may be adapted to be slidably raisible for a short distance in order to accommodate slightly differing heights of extensible rods 16. Upper member 48 may have a slidable lower portion 50 (FIG. 6) that permits a limited amount of such vertical sliding, with a conventional stop member to prevent excessive raising of the upper member 48, which of course would defeat the locking capability of the device. As before, the respective members 40, 48 define a pair of registering apertures 52, 54 which can receive a shackle-type lock 56 or the like for retention of connector 20c in a locked position. The extensible bar 16 of a vehicle extends through aperture 58 in such a manner that, in the closed position, locking lug 17 engages upper member 48 to prevent the theft of automobile 10. Bar 16 may slide sideways into aperture 58.

FIG. 7 shows a substitute, extendible bar system 60 which can be attached to the underside of vehicle 10 by pivot 62, and which can be a substitute for the telescoping bar system 12. In this embodiment, bar 60 can normally be held in a pivotal position which is parallel to the direction of motion of the vehicle. However, when it is desired to park the vehicle, bar 60 may be pivoted outwardly and into engagement with one of the connectors 20 described above. Then, upon closing of the top member of the connector, upwardly projecting locking lug 64 will engage against the upper plate or member of connector 20 to prevent removal of the car. In this embodiment, bar 60 is shown to be of round cross section rather than rectangular.

Figure 8:
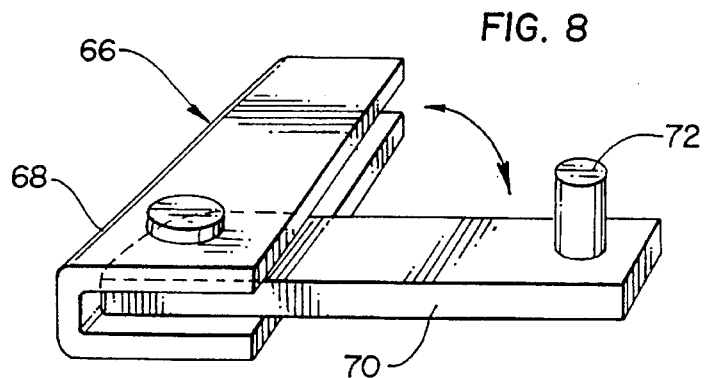

Referring to FIG. 8, a similar pivoting rectangular bar system 66 is shown. Bar 70 can pivot into housing 68 of U-shaped cross section, with the pivoting bar 70 being of rectangular cross section, and long enough so that upwardly projecting locking lug 72 does not engage housing 68 as bar 70 pivots into the housing in its travel position.

Bar 70 is pivoted outwardly when it is desired to park the car, for engagement with one of the connectors in a manner similar to that described above, to lock vehicle 10 in place.

FIG. 9 shows another embodiment of the extendible bar 12a, which may be carried by a vehicle 10 as shown and may extend laterally inwardly and outwardly in a manner similar to the embodiment of FIGS. 1 and 2. As before, the sliding bar 16a may slide into and out of a housing 14a which is carried on the bottom of the vehicle. In this embodiment, the outer end of bar 16a carries a pivotable flap 74 which, as indicated by arrows 76, can fold flat against bar 16a to fit into the cutout aperture 78 of housing 14a. Flap 74 may have a U-shaped periphery so that it is not locked in the aperture 78, to permit the free sliding inwardly and outwardly of bar 16a along with complete retraction of the bar and flap 74 underneath the vehicle. The vehicle sidewall may be at essentially the outer face 80 of housing 14a.

Once bar 16a is extended and locked into a connector similar to that disclosed above, it may be impossible for flap 74 to be placed downwardly again because of interference with the upper plate or member of the connector, until the connector is opened. Thus, vehicle 10 is securely retained.

Figure 10:
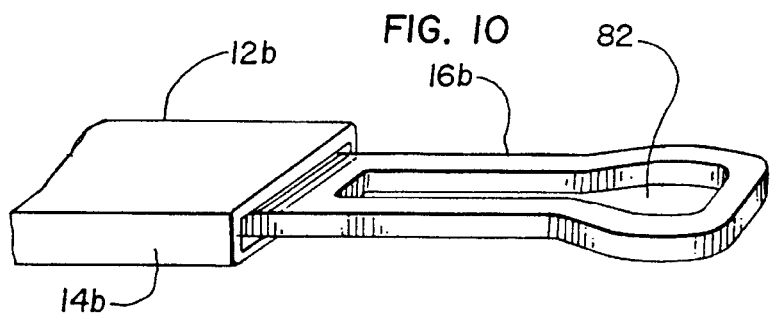
FIG. 10 is a perspective view of another embodiment of an extendible bar carried by a vehicle.
Figure 11:
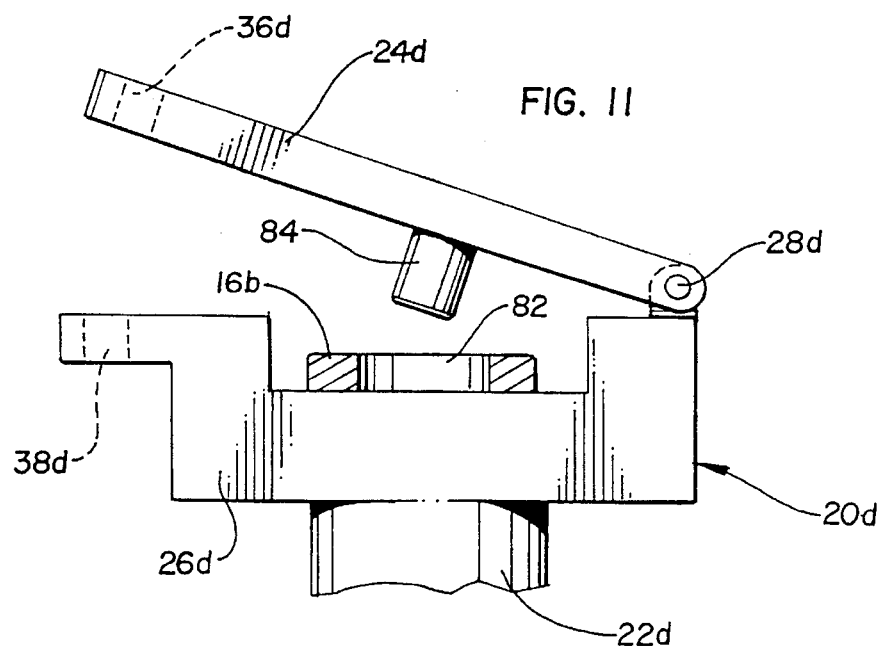
FIG. 11 is an embodiment of a special connector to which the extendible bar of FIG. 10 may be connected.

Referring to FIGS. 10 and 11, another embodiment of the extendible bar system 12b is shown, comprising a housing 14b and an extendible and retractable bar 16b which moves longitudinally inwardly and outwardly of housing 14b. In this embodiment, extendible bar 16b defines an elongated aperture 82. Bar 16b can connect with connector 20d having an upper member 24d and a lower member 26d which are connected by a vertical pivot 28d. Connector 20d is carried on a stanchion 22d, or is otherwise secured to a wall or the ground. Upper plate member 24d carries a sturdy projection 84, extending downwardly and proportioned to fit into aperture 82 of bar 16b. Connector 20d may be locked with a shackle-type lock or the like extending through the respective apertures 36d, 38d. In such a locked position, projection 84 extends through aperture 82 of bar 16b to provide locking of the vehicle 10.

The above has been offered for illustrative purposes only, and is not intended to limit the scope of the invention of this application, which is as defined in the claims below.

That which is claimed is:

1. An anti-theft system for vehicles, which system comprises: an extendible bar permanently carried by a vehicle, said extendible bar being movable between an extended position for locking the vehicle in place and a retracted position when the vehicle is in use; and a connector, separate from the vehicle and secured in stationary position, said connector being capable of forming a releasable, locked connection with said bar in the extended position, said connector comprising a top plate and a bottom plate, said plates being connected to define between them in an adjacent, parallel position an aperture sized to receive and lock said extendible bar, at least one of said plates being movable to a separated position permitting insertion and removal of said bar into and out of locked position in said aperture.

2. The anti-theft system of claim 1 in which said extendible bar is pivotally carried on the vehicle.

3. The anti-theft system of claim 1 in which said extendible bar is carried on the vehicle in longitudinally slidable relation.

4. The anti-theft system of claim 3 in which said extendible bar comprises a plurality of telescoping bar sections.

5. The anti-theft system of claim 4 in which a power unit is connected to said telescoping bar to cause said bar to extend and retract.

6. The anti-theft system of claim 1 in which said extendible bar comprises a free end and a locking lug projecting upwardly from said bar adjacent said free end.

7. The anti-theft system of claim 1 in which said top and bottom plates are secured to a stanchion.

8. The anti-theft system of claim 1 in which said extendible bar defines an aperture.

9. The anti-theft system of claim 8 in which said one movable plate defines a projection of a size to pass through said aperture of the extendible bar when the connector is in locked position.

10. An anti-theft system for securing a vehicle to a stationary member which comprises: an extendible bar permanently carried by one of said vehicle and said stationary member, said extendible bar being movable between various positions; and a connector carried by the other of said vehicle and said stationary member, said connector being capable of forming a releasable, locked connection with said bar, said connector comprising a top plate and a bottom plate, said plates being connected to define between them in an adjacent, parallel position an aperture sized to receive and lock said extendible bar, at least one of said plates being movable to a separated position permitting insertion and removal of said bar into and out of locked position in said aperture.

11. The system of claim 10 in which said stationary member is secured to a stanchion.

12. An anti-theft system for vehicles, which system comprises: an extendible bar permanently carried by a vehicle, said extendible bar being movable between an extended position for locking the vehicle in place and a retracted position when the vehicle is in use; and a connector, separate from the vehicle and secured in stationary position, said connector being capable of forming a releasable, locked connection with said bar in the extended position, said extendible bar comprising a free end and a locking lug projecting upwardly from said bar adjacent said free end, said locking lug being pivotally connected to said bar to permit said locking lug to lie flat against said bar.

13. The anti-theft system of claim 12 in which said connector comprises a top plate and a bottom plate, said plates being connected to define between them in an adjacent, parallel position an aperture sized to receive and lock said extendible bar, at least one of said plates being movable to a separated position permitting insertion and removal of said bar into and out of locked position in said aperture.

14. The anti-theft system of claim 13 in which said top and bottom plates are secured to a stanchion.

\* \* \* \* \*